United States Patent
Edens et al.

(10) Patent No.: US 6,927,676 B2
(45) Date of Patent: Aug. 9, 2005

(54) VEHICLE RADIO ANTI-THEFT ARRANGEMENT AND METHOD

(75) Inventors: John Edens, Mt. Clemens, MI (US);
Nabil M Issa, Novi, MI (US);
Abdul-Majeed Kadi, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 188 days.

(21) Appl. No.: 10/632,995

(22) Filed: Aug. 1, 2003

(65) Prior Publication Data

US 2005/0024190 A1 Feb. 3, 2005

(51) Int. Cl.$^7$ .......................... B60R 25/10; G08B 13/14; H05K 11/02
(52) U.S. Cl. ................ 340/426.1; 340/425.5; 340/426.34; 340/568.1; 340/572.1; 340/5.31; 340/5.56; 455/345; 455/346; 307/10.2
(58) Field of Search ........................ 340/426.1, 425.5, 340/426.34, 568.1, 572.1, 5.31, 5.65, 5.54; 455/345, 346, 347, 348; 307/10.2, 9.1

(56) References Cited

U.S. PATENT DOCUMENTS

| | | | | |
|---|---|---|---|---|
| 4,494,114 A | * | 1/1985 | Kaish | 340/5.31 |
| 4,604,708 A | * | 8/1986 | Lewis | 713/202 |
| 4,683,462 A | | 7/1987 | Takeda et al. | 340/571 |
| 4,720,700 A | | 1/1988 | Seibold et al. | 340/568.1 |
| 4,743,894 A | | 5/1988 | Bochmann | 340/691.6 |
| 4,808,981 A | | 2/1989 | Seibold | 340/568.1 |
| 5,091,724 A | * | 2/1992 | Go | 340/825.56 |
| 5,870,018 A | | 2/1999 | Person et al. | 340/5.65 |
| 6,111,504 A | * | 8/2000 | Packard et al. | 340/568.1 |

* cited by examiner

Primary Examiner—Donnie L. Crosland
(74) Attorney, Agent, or Firm—Ralph E. Smith

(57) ABSTRACT

A vehicle anti-theft arrangement and method relies on matching vehicle identifiers upon detection of vehicle battery cycling to confirm whether or not the component being protected is still resident in an authorized vehicle. The arrangement and method further includes a facile way for authorized personnel to override the protection mechanism using code word entries retrievable from a component manufacturer generated database.

9 Claims, 3 Drawing Sheets

VEHICLE RADIO ANTI-THEFT ARRANGEMENT AND METHOD

FIELD OF THE INVENTION

The invention relates generally to theft prevention/deterrence systems for vehicular components, such as radios. More particularly, the invention pertains to audio component anti-theft systems having the capability of being overridden by authorized personnel.

BACKGROUND OF THE INVENTION

Because audio equipment installed in vehicles are essentially expensive, lightweight and small in size, audio equipment has historically been the subject of much theft. With the thriving aftermarket network, the stolen equipment may be installed in almost any other vehicle.

Automobile manufacturers have employed numerous methods to prevent the audio equipment from being stolen out of the vehicles. For ease of description, the audio equipment will be referred to as a car radio. It is, however, understood that the audio equipment would encompass any sound system installed within an automobile, including cassette tape and compact disc (CD) players.

A variety of prior art approaches have been implemented to deter or prevent theft of such components, including mechanical methods utilizing special security screws to fasten the radio to the vehicle, and electronic methods requiring an operator to insert a special security code to unlock a car radio once the vehicle's battery has cycled. For example, see U.S. Pat. Nos. 4,720,700; 4,743,894; and 4,683,462. Similarly, U.S. Pat. No. 4,808,981 discloses an automotive electronic communication apparatus which prevents the connection of an external battery to a car radio prior to stealing it, in order to prevent an interruption in the power supplied to the car radio.

U.S. Pat. No. 5,870,018 teaches a theft prevention technique wherein a vehicle identification number (VIN) is initially loaded into non-volatile memory of the radio at the factory. Subsequently, upon battery cycling, a currently transmitted VIN on the vehicle's communication bus is compared to the previously stored VIN. If the VINs do not match, the normal operation of the radio is disabled. However, to reinitialize the radio for subsequent operation in a new vehicle, the dealer or service center must reinitialize the new VIN as the authorized VIN using a complex diagnostic system.

There is a need in the art for a component anti-theft arrangement which is both transparent to the vehicle operator and easily overridable by authorized service personnel.

SUMMARY OF THE INVENTION

Accordingly, a method for overriding an anti-theft arrangement for a vehicular audio component wherein a current vehicle identification number is compared to a previously stored VIN whenever the vehicle's battery has cycled comprises storing a preselected component identifier code in a non-volatile memory of the audio component. Whenever the current VIN is not identical to the stored VIN, entry of a code into the audio component is requested, and disablement of the audio component is overridden whenever an entered code is identical to the stored preselected component identifier code.

In another aspect of the invention, anti-theft apparatus for a vehicular audio component includes a stored program processor associated with the audio component and including a non-volatile memory, a vehicle communication bus coupling the processor to at least one vehicle control module for receipt of data messages thereover, and a data entry element coupled to the processor for transmitting externally entered code words thereto. The processor is operable to store a first vehicle identification number (VIN) and an audio component identifier code in the nonvolatile memory, to request receipt from the manual data entry element of a code word whenever a battery cycle has been detected by reinitialization of the processor and a second VIN read from the bus is not identical to the stored first VIN, and to inhibit operation of the audio component until receipt of a code word identical to the audio component identifier code.

BRIEF DESCRIPTION OF THE DRAWING

The objects and features of the invention will become apparent from a reading of a detailed description, taken in conjunction with the drawing, in which.

DETAILED DESCRIPTION

Figure 1:
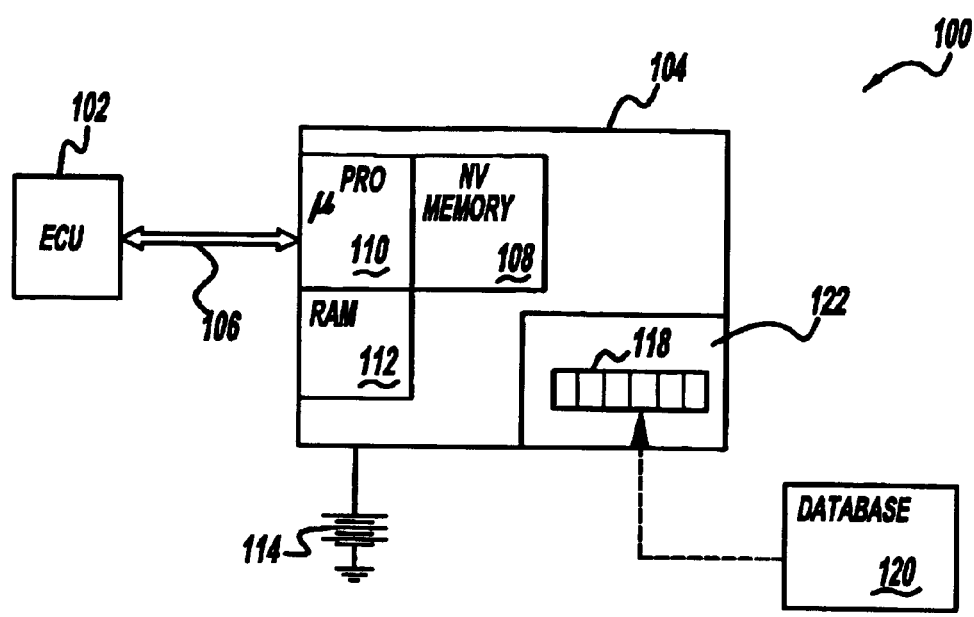
FIG. 1 is a block diagram of radio anti-theft apparatus arranged in accordance with the principles of the invention.

FIG. 1 depicts a system block diagram of an arrangement 100 for providing anti-theft protection for a battery-powered vehicular component, such as a radio. With reference to FIG. 1, arrangement 100 centers about a vehicle radio 104 having a microprocessor 110 equipped with random access memory 112. Additionally, microprocessor 110 includes a non-volatile memory 108, such as an EEPROM.

Also included in radio 104 is a human/machine interface, such as a plurality of data entry elements, such as pushbutton switches 118 normally associated with a faceplate 122 of the radio.

A programmable controller, such as a body controller 102 is coupled to radio 104 via a vehicular communication bus 106. The electrical components of the system 100 are powered principally by a vehicular battery 114.

The system and method of the invention centers around detection of battery cycling. As known to those skilled in the relevant art, a battery cycle comprises either disconnecting the battery for a time long enough for all residually stored voltages to discharge, or taking a component such as radio 104 out of its authorized vehicle and putting it into another, or replacing the battery for maintenance reasons (or at least disconnecting it from the battery terminals in the vehicle). There are various methods of detecting the occurrence of a battery cycle. One would be for a hardware battery detector to set a software flag in the radio 104 microprocessor 110 as power is going down. Preferably, we rely on the fact that in modern vehicles equipped with software in various controllers, such software is restarted and goes through an initialization routine after a battery cycle. This initialization routine can be used in and of itself to indicate that cycling has taken place.

With continued reference to FIG. 1, once battery cycling has been detected at microprocessor 110, the radio may be disabled as detailed below where it is determined that the radio 104 has been removed from its authorized vehicle. Under these circumstances, apparatus and methods must be provided to override the theft prevention system by authorized personnel. The invention contemplates a database 120 which is generated by the manufacturer of the audio component being protected. Essentially, the manufacturer will place a unique component identifier code, preferably of four digits, for each serial number of the component produced by the manufacturer. Authorized service personnel can then access database 120 to retrieve the identifier code for the serial number of radio 104 which they wish to reinitialize. Once the code has been retrieved it is manually entered via data entry switches 118 into microprocessor 110. Upon receipt of this code, processor 110 compares the entered code with a code stored in non-volatile memory 108 either at the component manufacturer facility or at an assembly plant when the radio is first installed in the vehicle. Upon such a match, radio 104 is re-enabled for normal operation.

Figure 2A:
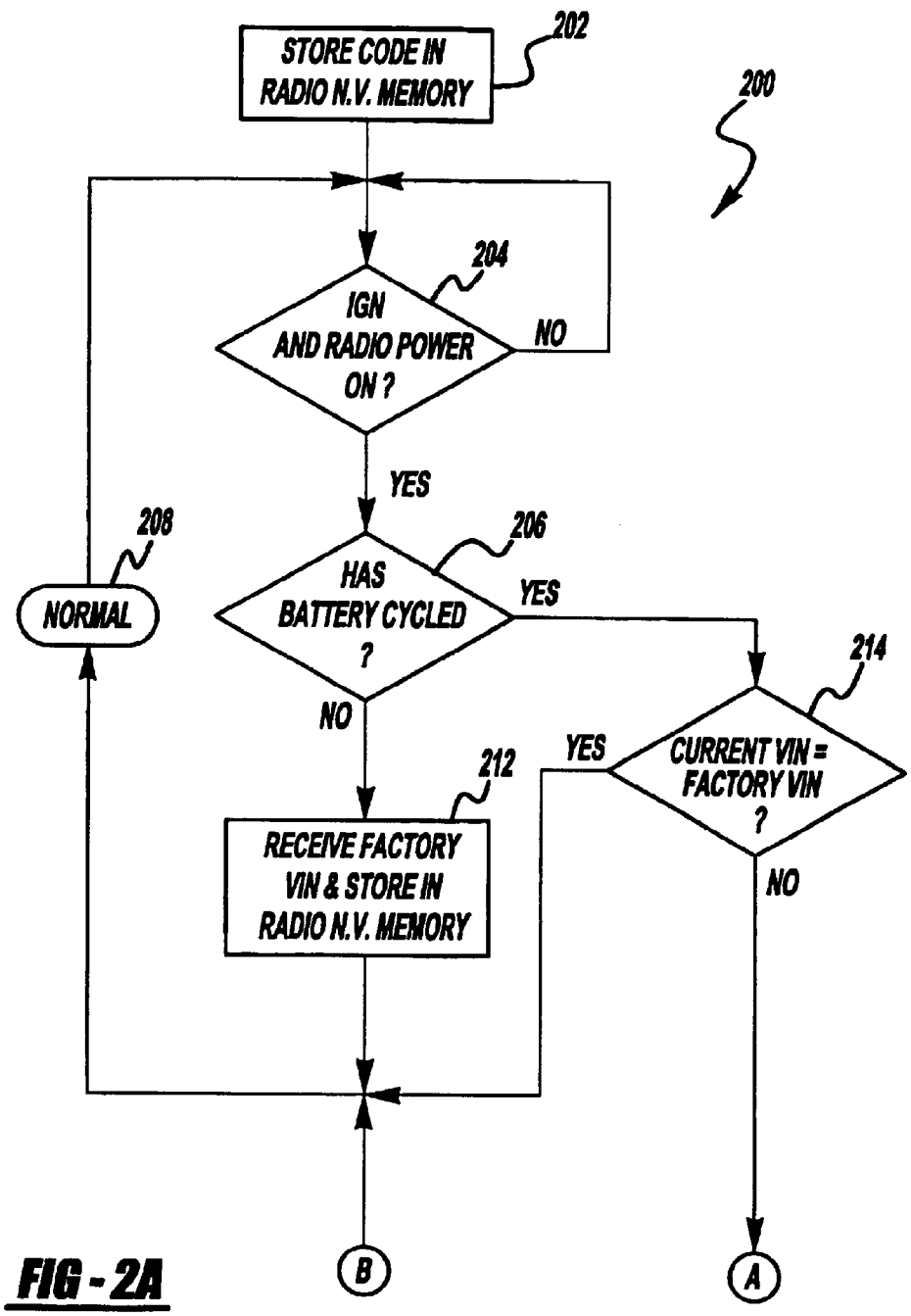
FIGS. 2A, 2B set forth a flow chart outlining a method of radio anti-theft provisions in accordance with the principles of the invention.

The details of the anti-theft prevention and override method of the invention are best described with reference to the flow chart of FIGS. 2A and 2B. Routine 200 begins at step 202 where the identifier code is stored in the radio's non-volatile memory 108. At decision block 204, processor 110 determines whether the ignition and the radio power are on. If not, the routine continually loops back to decision block 204 to monitor for power up.

If the ignition and radio power is on, the routine proceeds to decision block 206 to determine whether a VIN is resident in nonvolatile memory 108. If no VIN is present, this indicates an initial factory installation of a vehicle battery is taking place upon assembly of the new vehicle. If this is the initial battery connection, then processor 110 at step 212 fetches a factory VIN which is being transmitted over vehicle bus 106 by elements such as body control unit 102 and stores this initial VIN in non-volatile memory 108. The routine then returns to normal radio operation at 208. Once the radio is turned off, the routine returns to decision step 204.

If a VIN is present at step 206, then the routine proceeds to step 214 wherein the VIN being currently transmitted on the bus 106 is compared to the factory VIN stored in non-volatile memory 108. If the VINs match at step 214, the routine proceeds to normal radio operation at 208. If the VINs do not match, the routine proceeds to the flow chart of FIG. 2B at entry point A.

Figure 2B:
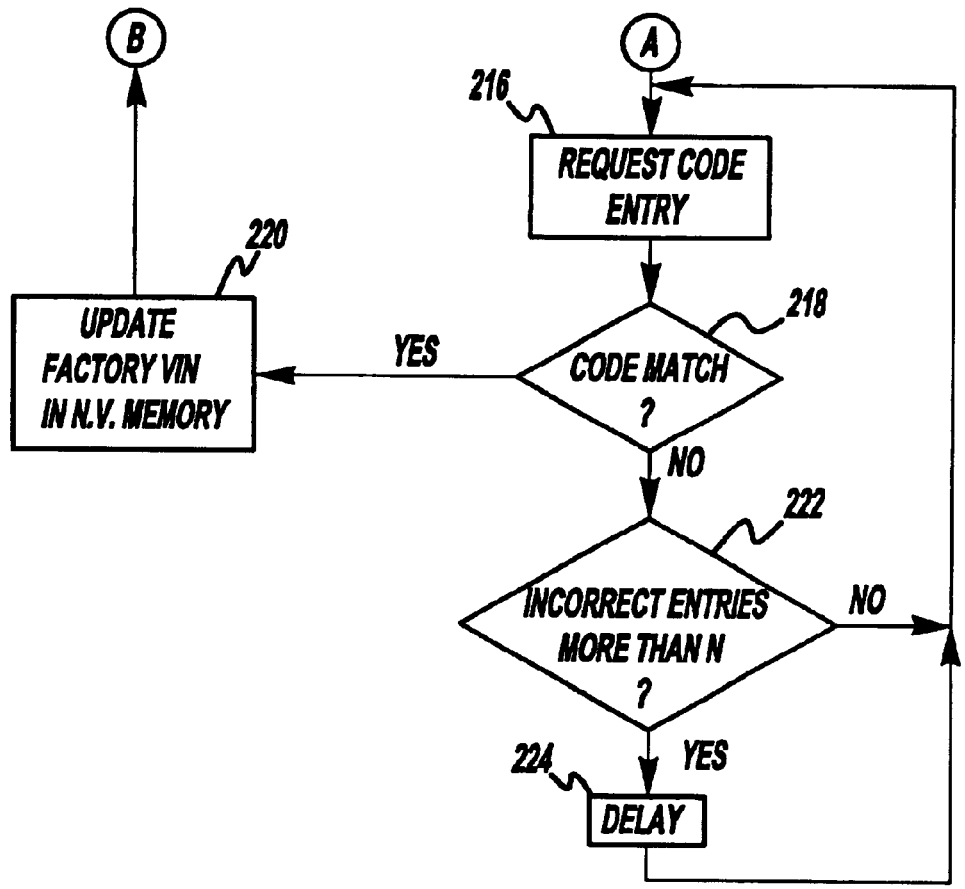

With reference to FIG. 2B, the routine then proceeds to step 216 where the program in processor 110 will request entry of an identifier code via switches 118. At decision block 218, if the entered code matches the initially stored identifier code in non-volatile memory 108, the software in the radio 104 proceeds to block 220 and updates or overwrites the factory VIN in non-volatile memory for subsequent use. The routine then returns to normal operation 208 in FIG. 2A via entry point B.

If the entered code does not match the code stored in non-volatile memory 108 of the radio 104, then the routine proceeds to decision block 222 where it is determined how many incorrect entries have been made. If the number of incorrect entries is more than a preselected number N, then the routine enters into a delay cycle, e.g., for 30 minutes, at step 224 prior to returning to step 216 to continue the request for code entry. If the number of incorrect entries is less than N, the routine returns immediately to step 216. It is therefore seen that the radio will remain disabled until a code match is found at decision block 218. If no code has been entered pursuant to request 216, radio 104 will continue to prompt for code entry.

The method and arrangement of the invention is transparent to the customer so long as either no battery cycling occurs or if it does, the VIN match indicates that the radio has remained in its authorized vehicle. Additionally, the theft prevention arrangement may be easily overridden by authorized personnel having access to a database of code identifier words stored as a function of component identification numbers, such as serial numbers.

The invention has been described with reference to a detailed example. The scope and spirit of the invention is to be determined only with proper interpretation of the appended claims.

What is claimed is:

1. In an anti-theft arrangement for a vehicular audio component wherein a current vehicle identification number (VIN) is compared to a previously stored VIN whenever the vehicle's battery has cycled and the audio component is disabled whenever the current VIN is not identical to the stored VIN, a method for overriding disabling of the audio component comprising:

storing a preselected component identifier code in non-volatile memory of the audio component;

whenever the current VIN is not identical to the stored VIN, requesting entry of a code into the audio component; and overriding disablement of the audio component whenever an entered code is identical to the stored preselected component identifier code.

2. The method of claim 1 further comprising updating the stored VIN whenever the entered code is identical to the stored preselected component identifier code.

3. The method of claim 1 further comprising:

establishing a database associating a serial number of each audio component equipped with the anti-theft arrangement with its preselected component identifier code; and enabling authorized personnel to access the database to retrieve their preselected component identifier code upon entry of the component's serial number.

4. A method of disabling a vehicular audio component whenever the component is removed from its vehicle, the method comprising:

(a) storing a predetermined component identifier code in the audio component;

(b) whenever the ignition and component power are on, determining whether the vehicle's battery has cycled since a previous power-up, and enabling the component to power-up normally if the battery has not so cycled;

(c) when battery cycling has occurred, determining whether this is an initial battery connection to the audio component;

(d) if this is the initial battery connection, receiving a first vehicle identification number (VIN) from a vehicle communication bus, storing the first VIN in the audio component and enabling the component to power-up normally;

(e) whenever the battery cycling is not due to the initial connection to the audio component, receiving a second VIN from the bus and enabling the audio component to power-up normally only when the second VIN is identical to the stored first VIN; and (f) whenever the second VIN is not identical to the first VIN, disabling normal power-up of the audio component until an externally entered code input to the audio component matches the stored component identifier code.

5. The method of claim 4 further comprising replacing the stored first VIN with the second VIN whenever the externally entered code matches the stored component identifier code.

6. Anti-theft apparatus for a vehicular audio component, the apparatus comprising:

a stored program processor associated with the audio component and including a non-volatile memory;

a vehicle communication bus coupling the processor to at least one vehicle control module for receipt of data messages thereover; and a data entry element coupled to the processor for transmitting externally entered code words thereto;

the processor operable to store a first vehicle identification number (VIN) and an audio component identifier code in the non-volatile memory, to request receipt from the manual data entry element of a code word whenever a battery cycle has been detected by reinitialization of the processor and a second VIN read from the bus is not identical to the stored first VIN, and to inhibit operation of the audio component until receipt of a code word identical to the audio component identifier code.

7. The apparatus of claim 6 wherein the processor is further operable to replace the stored first VIN with the second VIN whenever the externally entered code word is identical to the audio component identifier code.

8. The apparatus of claim 6 wherein the data entry element comprises manually operable switches associated with a face plate of the audio component.

9. The apparatus of claim 6 wherein the audio component comprises a radio.

* * * * *